(No Model.)

O. A. & J. T. SMITH & J. O. COUCH.
CAP FOR CARRIAGE AXLES.

No. 327,732. Patented Oct. 6, 1885.

Witnesses
Chas. H. Smith
J. Stail

Inventors
Otis A. Smith
John T. Smith
John O. Couch
per Lemuel W. Serrell
atty

UNITED STATES PATENT OFFICE.

OTIS A. SMITH, JOHN T. SMITH, AND JOHN O. COUCH, OF MIDDLEFIELD, CONNECTICUT, ASSIGNORS TO JOHN I. HOLLY, OF NEW YORK, N. Y.

CAP FOR CARRIAGE-AXLES.

SPECIFICATION forming part of Letters Patent No. 327,732, dated October 6, 1885.

Application filed February 27, 1885. Serial No. 157,209. (No model.)

*To all whom it may concern:*

Be it known that we, OTIS A. SMITH, JOHN T. SMITH, and JOHN O. COUCH, of Middlefield, in the county of Middlesex and State of Connecticut, have invented an Improvement in Caps for Carriage-Axles, of which the following is a specification.

Caps have been made use of for carriage-axles in which there is a pin actuated by a spring, the pin entering a recess or hole in the axle near the end; but it was necessary to make use of a lever, two joints, and a fulcrum between the spring and the pin.

Our invention is for dispensing with the lever, simplifying the parts, and rendering them less liable to injury when in use.

We make use of a pin connected by a head to a bolt that passes transversely through the cap, and around which bolt is a spring, so that by pressing upon the head of the bolt the same will be moved endwise against the action of the spring, and the pin forced out from the hole in the axle so that the cap can be removed. We also combine with the said pin and bolt a movable band surrounding the cap, and which is capable of being partially revolved for securing the pin and its head in place.

Figure 1:
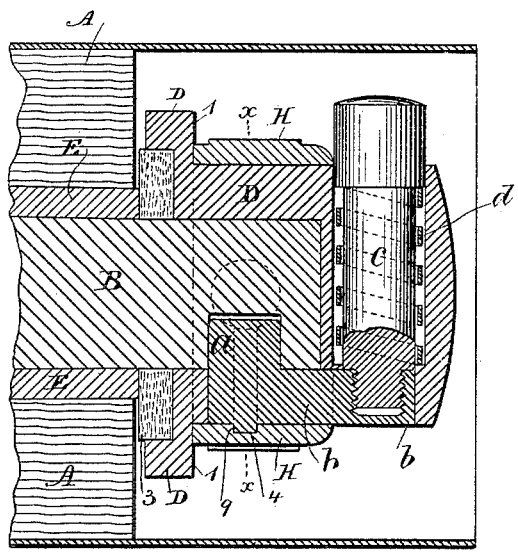
Figure 4:
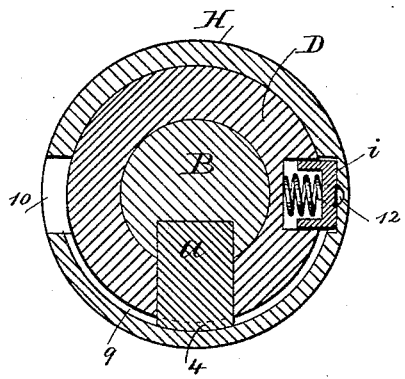
Figure 2:
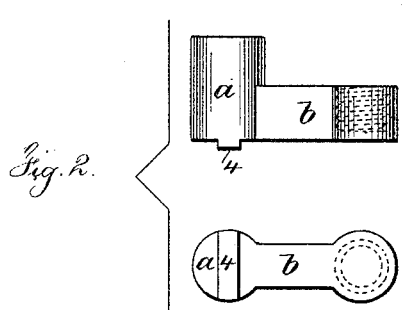
Figure 3:
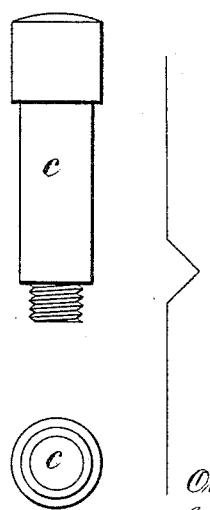

In the drawings, Figure 1 is a section of the axle-cap and a portion of the hub. Fig. 2 is an elevation and end view of the pin and head. Fig. 3 is an elevation and end view of the bolt; and Fig. 4 is a section at the line $x\ x$, representing the band that surrounds the pin and head to secure them in place.

The axle B, the tubular axle-box E, and the hub A are of ordinary construction. The cap D is adapted to be placed upon the end of the axle B, and it will usually be provided with a recess for a leather washer, 3, at the end of the axle-box E.

There is a hole passing transversely through the cap near its outer end, and there is also a hole passing through the cap at one side and in line with the hole that passes into the axle B. Into this last-named hole the locking-pin $a$ is introduced, and the same is connected by a head, $b$, to the bolt $c$, that passes through the hole near the end of the cap. The bolt $c$ has an enlargement or head and around the body a helical spring, $d$, which by its expansion acts to force the pin $a$ into the hole in the axle, and hold the cap in place upon said axle. Upon forcing down the outer end of the bolt $c$ the pin $a$ is removed from the hole in the axle, and the parts are thereby separated.

It is to be understood that the cap D is recessed at one side so as to receive the head $b$, that connects the pin $a$ and bolt $c$. These parts thus far described may alone be made use of and the cap will be held effectually upon the end of the axle; but we prefer to use the parts hereinafter described to more fully secure the bolt when in its place.

The band H surrounds the cap D between the flange 1 and the head of the bolt $c$. There is a rib or projection at 4, upon the head of the pin $a$, and the interior of the band H is turned out with a groove, as at 9, so that such band H can be partially revolved, so as to come over and retain the pin $a$ in its place in the axle B. This band H is notched at one place, as at 10, so that when revolved to bring this notch adjacent to the pin $a$ and head $b$ the cap can be detached by pressing upon the bolt $c$, and when the said band H is again partially revolved it incloses and confines the end of the pin $a$ and head $b$.

If it is desired to latch this band H so that it cannot revolve, we introduce a spring-plug, $i$, in a recess in the cap at one side and form a cavity in the inner surface of the band, into which the spring-plug $i$ passes when the ring has been turned around to bring the recess over the end of the plug $i$. By this means the ring will be effectually held so that it cannot turn. Any suitable device may be provided to press the plug $i$ down out of the recess to unlock the ring and allow it to be rotated, such, for instance, as a hole in the ring at the end of the plug, through which a piece of wire may be inserted; but usually it is best to bore a hole transversely into the ring on line with the center of the recess, as at 12, for the plug $i$. A wire pin inserted into this hole will prevent the plug $i$ springing up into the recess, and when such pin is withdrawn the plug can lock the ring H firmly in position. The introduction of a piece of wire with a beveled end into this hole effects the unlocking of the ring by acting as a wedge to force down the spring-plug $i$.

This cap for carriage-axles is cheap to construct and very efficient in use, and it cannot become detached accidentally unless the parts are broken.

We claim as our invention—

1. The combination, with the axle-cap, of a locking-pin, $a$, head $b$, and bolt $c$, the latter passing transversely through the cap, and the spring $d$ around said bolt, substantially as set forth.

2. The combination, with the cap D, locking-pin $a$, head $b$, and bolt $c$, of the band H surrounding the cap and having an opening at which the pin may be pressed back out of the axle, substantially as set forth.

3. The combination, with the cap D, locking-pin $a$, head $b$, and bolt $c$, passing transversely through the cap, of the spring $d$, surrounding the bolt, the band H, around the cap, having an opening for the locking-pin and a cavity, and the spring-lock $i$, substantially as set forth.

Signed by us this 23d day of February, A. D. 1885.

OTIS A. SMITH.
  JOHN T. SMITH.
  JOHN O. COUCH.

Witnesses:
 CHAS. G. R. VINAL,
 JOHN WILCOX.